March 23, 1954 A. C. PATCH ET AL 2,673,050
CANOPY ACTUATING ASSEMBLY
Filed May 5, 1952 4 Sheets-Sheet 1

INVENTORS
ARTHUR C. PATCH
EDWIN L. WALLENHORST
BY
William R. Lane
ATTORNEY

INVENTORS
ARTHUR C. PATCH
EDWIN L. WALLENHORST

ATTORNEY

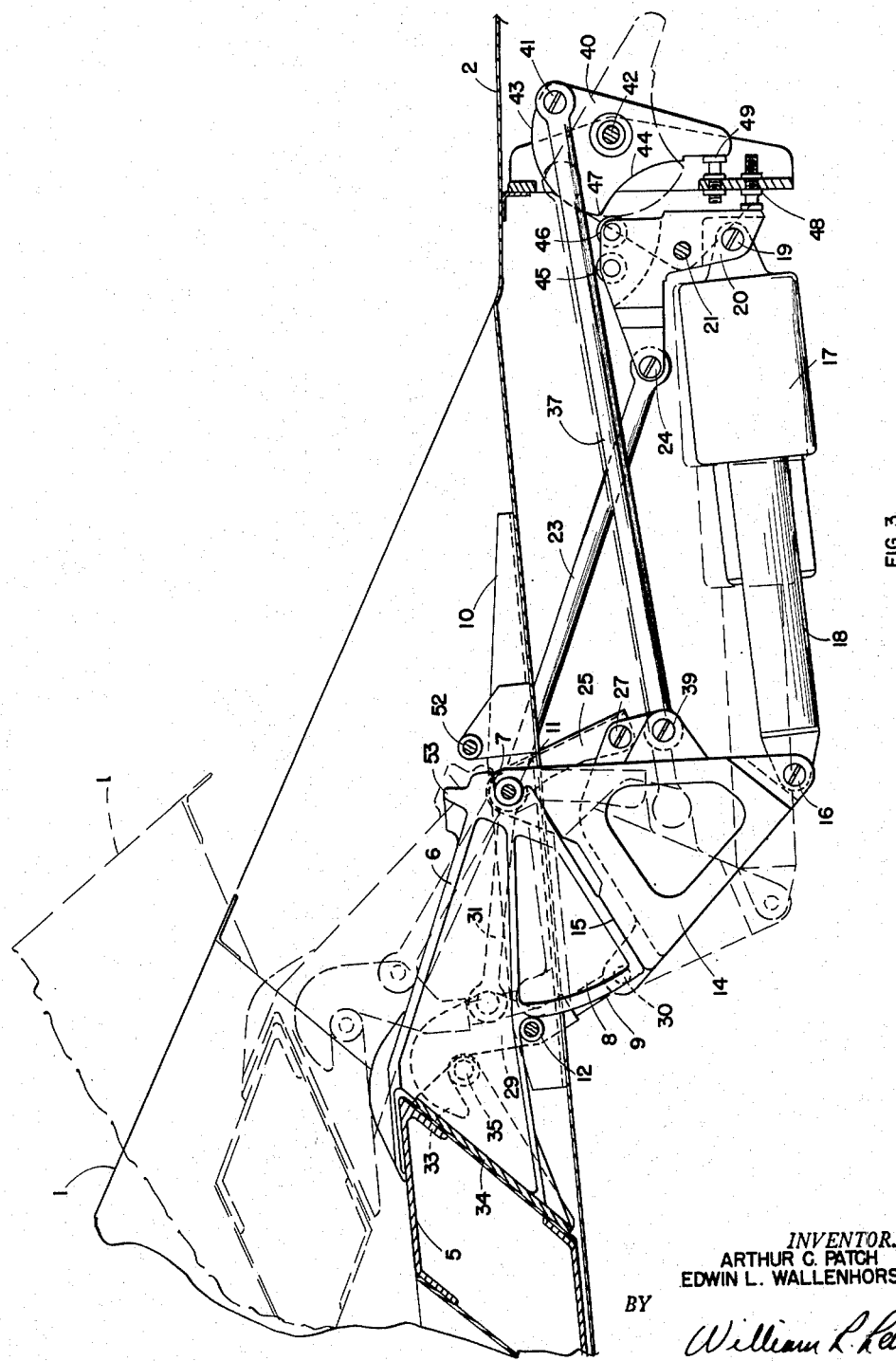

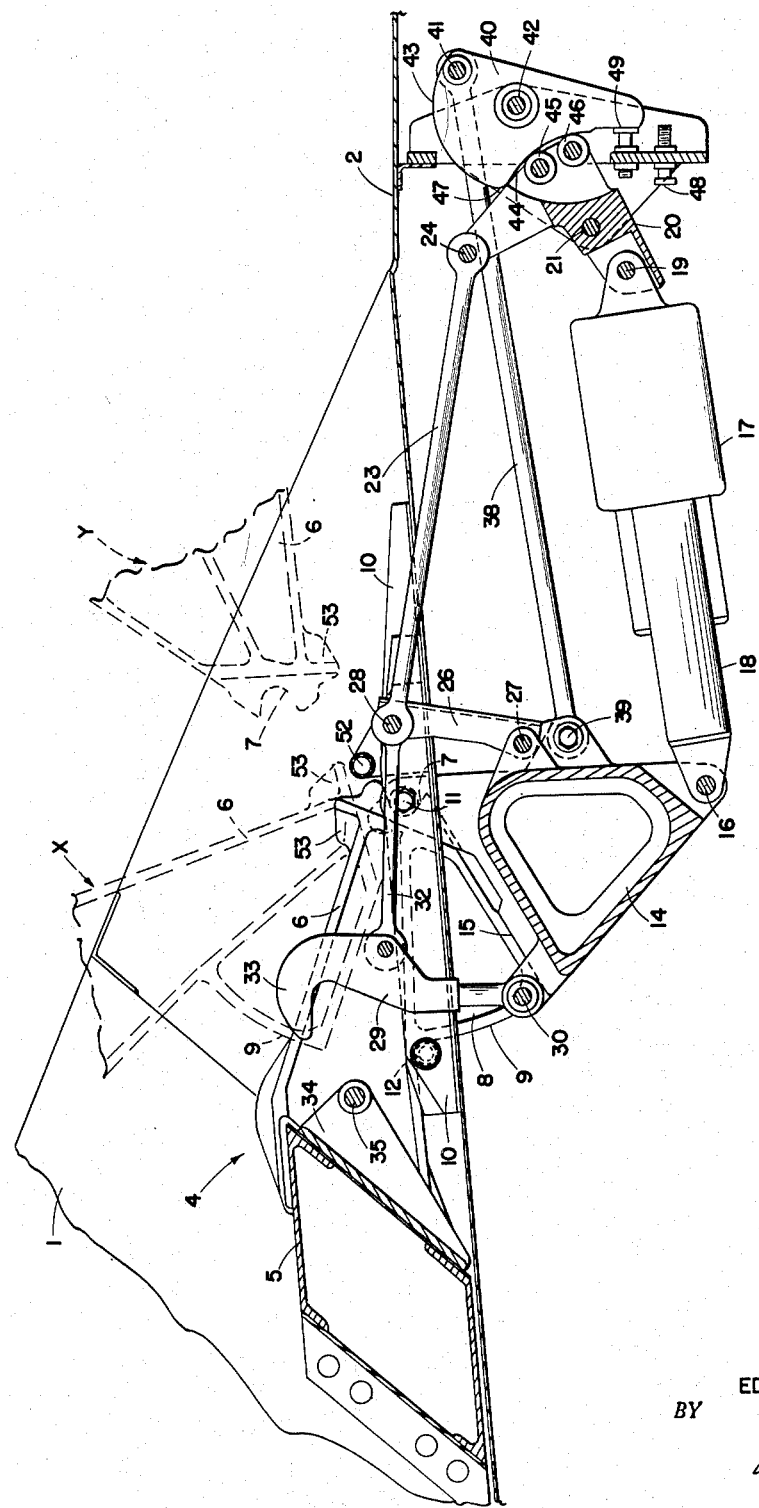

Patented Mar. 23, 1954

2,673,050

UNITED STATES PATENT OFFICE 2,673,050

CANOPY ACTUATING ASSEMBLY

Arthur C. Patch, Encino, and Edwin L. Wallenhorst, Torrance, Calif., assignors to North American Aviation, Inc.

Application May 5, 1952, Serial No. 286,044

8 Claims. (Cl. 244—121)

This invention pertains to a canopy actuating assembly and more particularly to an assembly for use with an aircraft canopy.

An object of this invention is to provide a canopy actuating assembly that may be disengaged from the canopy so that the canopy may be jettisoned.

Another object of this invention is to provide a canopy actuating assembly that will raise and lower a canopy from the rear.

An additional object of this invention is to provide a canopy actuating assembly that will open a canopy by pivotal movement.

A further object of this invention is to provide a canopy actuating assembly that is quick in its action, that will retain the canopy in any desired position, and that will securely hold a canopy in an open position.

These and other objects will become apparent from the following detailed description taken in connection with the accompanying drawings in which Fig. 1 is a perspective view of a canopy mounted on an airplane and showing the auxiliary fastening means;

Fig. 3 is a sectional view taken along line 3—3 of Fig. 2 with the assembly shown in intermediate and fully extended positions; and Fig. 4 is a sectional view taken along line 4—4 of Fig. 2 with the assembly in fully retracted position.

Figure 1:
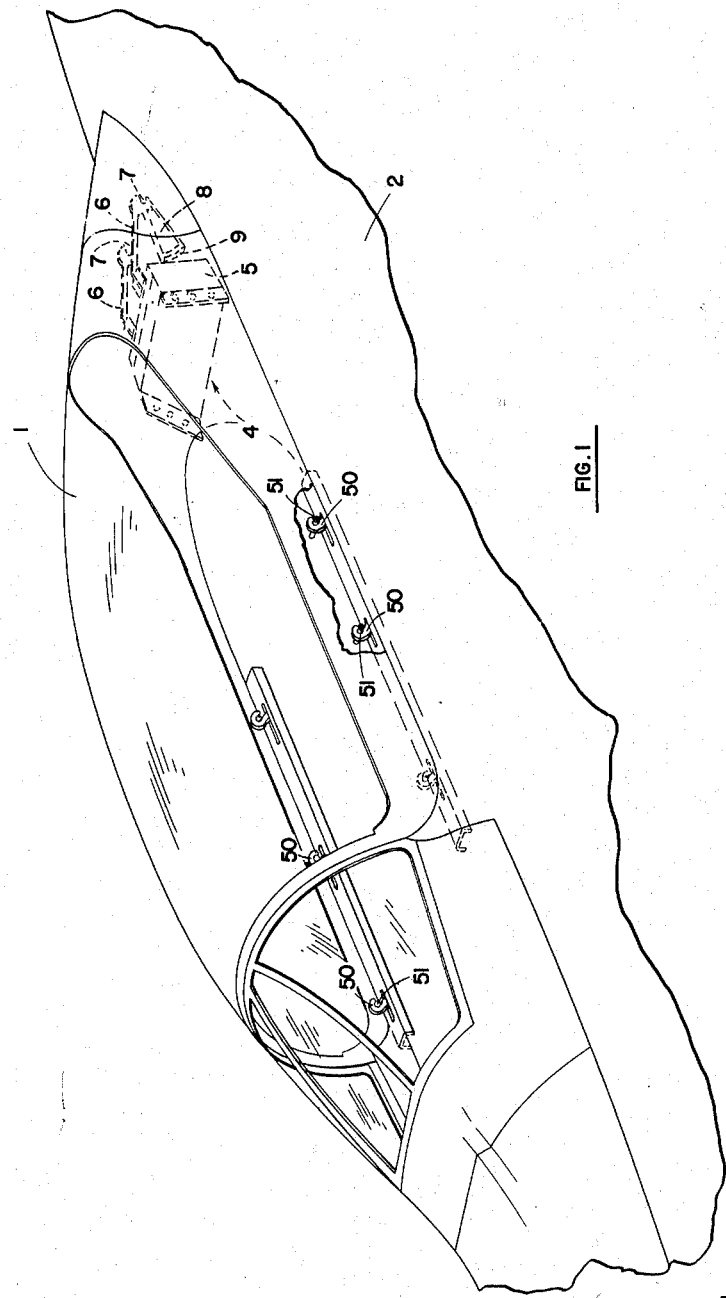

This actuating assembly is intended for usage with an ordinary aircraft canopy 1 associated with an aircraft fuselage 2. The assembly is located at the rear of the canopy and serves to pivot the canopy about the rear portion thereof for allowing access to the interior of the fuselage.

The elements of the assembly include a canopy member 4 which may be made up of a cross beam 5 adapted to be disposed transversely in the fuselage and to be attached at its outer ends to the canopy. The canopy member 4 also includes a pair of parallel retaining elements 6 projecting from cross beam 5. These elements include slots 7 in their ends, and depending portions 8 which have arcuate forward surfaces 9. Mounted within the airplane in any suitable manner, such as by attachment to frame members 10 riveted in the fuselage, are a pair of trunnions 11 and a pair of rollers 12. The retaining elements 6 of the canopy member are adapted to receive trunnions 11 within slots 7 while arcuate surfaces 9 may engage rollers 12. In this manner the canopy member is made pivotal around trunnions 11, prevented from forward movement by rollers 12, yet is free to disengage the trunnions upon upward pivotal movement to a point where rollers 12 no longer engage arcuate surfaces 9. Also pivotally mounted on trunnions 11 is a drive member 14 which includes surface 15 adapted to engage the bottom of depending portions 8 of elements 6. Drive member 14 does not grip the canopy member in any manner. The member is pivotally connected at its bottom portion by pin 16 to an actuator 17. This actuator may be any suitable kind and is preferably of the type including an ordinary electrically driven extensible and retractable element 18. The end of the actuator opposite from the drive member is pivotally connected by pin 19 to arm 20, which is in turn pivotally mounted to the structure of the aircraft by means of pin 21. The other end of arm 20 is pivotally connected to link 23 by pin 24. A pair of links 25 and 26 are pivotally connected to drive member 14 by a pin 27, and at their opposite ends engage link 23 by pin 28. A link 29 is pivotally connected to the drive member 14 by pin 30 and interconnected with links 23, 25 and 26 by connecting links 31 and 32. Link 29 is provided with detent or hook portion 33 projecting beyond members 31 and 32. Canopy member 4 includes bracket portion 34 which carries a shear pin 35. Detent 33 is adapted to engage the shear pin as may best be seen in Fig. 3.

A pair of links 37 and 38 extend rearwardly from the drive member from the point of their pivotal connection therewith by pin 39, and connect with a cam member 40 through pin 41. The cam member is pivotally mounted in the aircraft structure by pin 42 and is provided with a convex arcuate surface 43 and a concave arcuate surface 44. Arm 20 includes a slotted portion on the top in which are rotatably mounted rollers 45 and 46. Detent 33 and the other links thus provide for the canopy member a retention means which engages cam 40.

Figure 2:
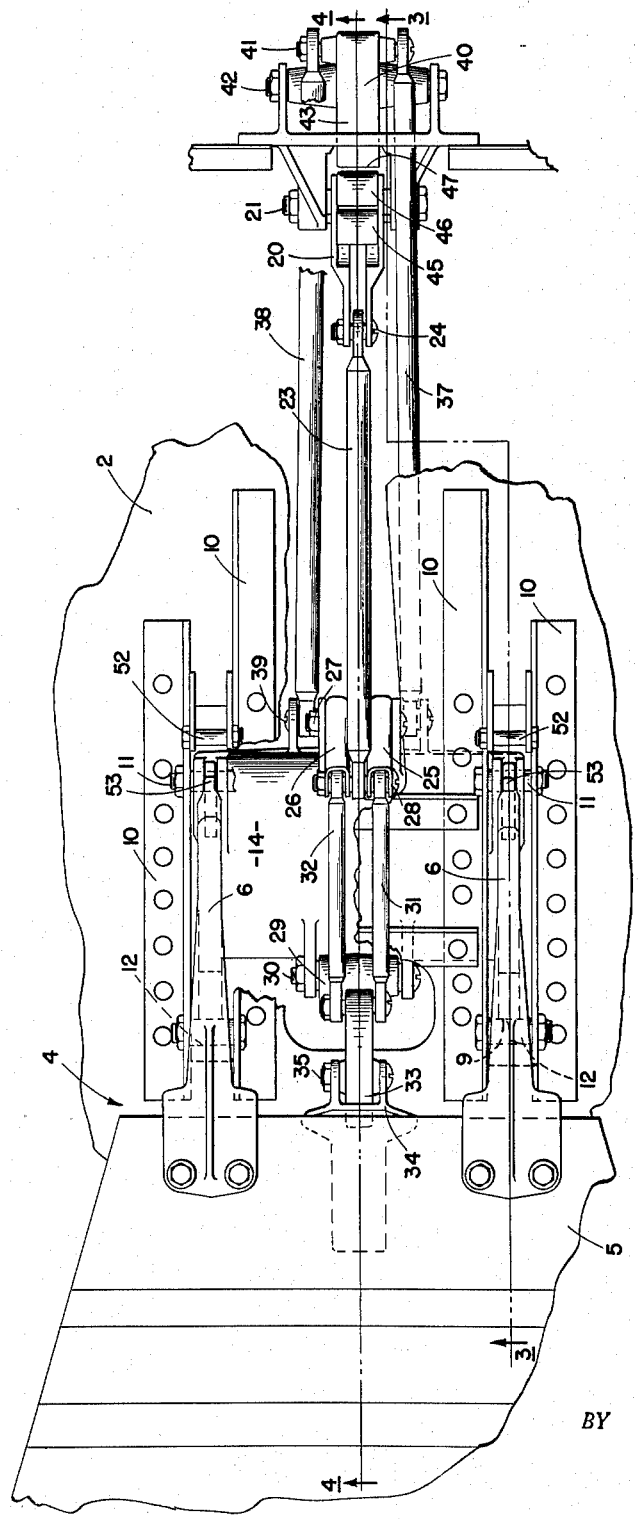
Fig. 2 is a plan view of the actuating assembly of this invention, with the canopy removed for purposes of clarity.

The operation of the canopy actuating assembly is such that when the canopy is in a fully lowered position and the actuator movable element 18 is in an intermediate position, detent 33 engages shear pin 35. This intermediate position is shown in Fig. 2, and in Fig. 3 in solid lines. While the shear pin is so engaged by the detent, pin 28 is located on a projection of the center line of trunnions 11. Corner 47 between surfaces 43 and 44 of cam 40 is then disposed opposite roller 45. Extension of the actuator from the intermediate position pivots drive member 14 clockwise in the drawings about trunnions 11. This in turn, because surface 15 of member 14 engages the bottom of elements 6 of canopy member 4, raises the canopy member by also pivoting this member about trunnions 11 and lifts aircraft canopy 1. The canopy mechanism with the actuator extended in this manner is illustrated by broken lines in Fig. 3. As drive member 14 pivots, links 37 and 38 are pulled forwardly by the drive member, thus rotating cam member 40. Convex arcuate surface 43 of the cam member then engages roller 45 which prevents arm 20 from pivoting and keeps the bottom portion of this arm in engagement with stop 48 despite the rotative force exerted thereon by the extension of the actuator. The common centerline of trunnions 11 and pin 28 allows the drive member, canopy member and the detent to be raised together without any relative movement among them. Retraction of the actuator to the intermediate position will again lower the canopy and rotate cam 40 to a position where corner 47 between surfaces 43 and 44 is opposite roller 45. In this intermediate position of the assembly the lower portion of the cam will engage stop 49 which serves to preclude further rotation of cam 40.

Further retraction of the actuator from the intermediate position to the fully retracted position (illustrated in Fig. 4) will rotate arm 20 downwardly with rollers 45 and 46 engaging concave arcuate surface 44 of the cam member. This comes about because links 37 and 38 connect with cam 40 which by being in engagement with stop 49 will prevent any further rotation of the drive member 14. Links 37 and 38 thus act through the cam to oppose the force produced by the actuator in shifting from the intermediate to the fully retracted position and prevent the drive member from rotating further. When the assembly is in the intermediate position cam 40 is in a position where it no longer interferes with arm 20, so that retraction of member 18 of the actuator from the intermediate position will shift the actuator itself forwardly in the airplane (to the left in the drawing), effecting rotation of arm 20. As this movement occurs link 23 will pull on link 29 through links 31 and 32 which will pivot link 29 so that detent 33 disengages shear pin 35. The canopy member is in this manner freed of any force in the actuating assembly restraining pivotal upward movement thereof.

In a typical installation of this actuating assembly auxiliary means attached to the fuselage such as hooks 50 are provided for holding the canopy in a lowered position. When the actuating assembly has lowered the canopy from a raised position and attained the intermediate position, hooks 50 may be caused to engage pins 51 of the canopy and firmly hold it in place on the aircraft fuselage. The operation of the assembly may be so arranged that upon retraction of the landing gear when the aircraft is in flight the actuator will be operated to retract from the intermediate position for pivoting link 29, thus removing detent 33 from shear pin 35. The canopy is then held only by auxiliary hooks 50.

Any suitable canopy jettisoning means may be provided in the aircraft for removing the canopy in case of emergency so that the pilot may escape from the airplane. The actuating assembly, no longer exerting a force restraining upward movement of the canopy, will allow the canopy to pivot upon disengagement of hooks 50 to a position where arcuate surfaces 9 of depending portions 8 no longer engage rollers 12 and slot 7 is free to disengage trunnions 11. Position X of Fig. 3 illustrates canopy member 4 at the beginning of a jettisoning operation with arcuate surfaces 9 free of rollers 12 and slots 7 disengaged from trunnions 11.

There may be provided, in addition, pry-out pins 52 for assisting the jettisoning action of the canopy. As the canopy pivots rearwardly when not restrained by detent 33 or hooks 50, lugs 53 of the canopy member will engage the pry-out pins which will tend to assist the pivotal movement of the canopy and deflect the canopy to prevent its striking other portions of the aircraft. Position Y of Fig. 3 shows the canopy member following engagement with pry-out pins 52. Under normal conditions, where the canopy is not jettisoned, the actuator will be returned to the intermediate position upon lowering of the landing gear. When the airplane is on the ground, hooks 50 may be released and the actuator shifted to the extended position so that the canopy is raised with detent 33 exerting its restraining force on the canopy member.

Shear pin 35 may be so designed that upon failure of the actuating assembly to operate from the intermediate position to the fully retracted position, thus failing to release the canopy from the actuating assembly, the pin will shear off at some predetermined force which may result from aerodynamic force on the canopy or from a positive ejection force such as an explosive charge, thus freeing the canopy from the actuating assembly.

The teachings of this invention have thus provided a canopy actuating assembly that will pivot a canopy about its rear portion, that will firmly hold it in place while open and that will release the canopy when desired so that the canopy can be held by auxiliary means and jettisoned at will.

The foregoing detailed description is to be clearly understood as by way of illustration only and is not to be taken by way of limitation, the spirit and scope of this invention being limited only by the appended claims.

We claim:

1. A canopy actuating assembly for an aircraft comprising a canopy member pivotally mounted in said aircraft; an actuator, said actuator being movable between an extended position, an intermediate position and a retracted position; a drive member pivotally mounted in said aircraft and pivotally secured to one end of said actuator, said drive member operatively engaging said canopy member whereby when said actuator is in said extended position said canopy member is raised by said drive member and when said actuator is in said intermediate position said canopy member is in a lowered position; an arm pivotally mounted in said aircraft and pivotally secured to the end of said actuator remote from said drive member; a detent member pivotally mounted on said drive member and adapted to engage portions of said canopy member for preventing upward movement of said canopy relative to said drive member; means interconnecting said arm and said detent member whereby when said actuator is moved from said intermediate position to said retracted position said means pivots said detent member relative to said drive member for effecting disengagement thereof from said canopy member; a cam member pivotally mounted in said airplane; and means operatively interconnecting said cam member and said drive member whereby when said drive member is raised said cam member is in engagement with said arm for thereby preventing pivotal movement thereof, and when said drive member is lowered and said actuator is moved to said retracted position said cam is rotated to a position remote from said arm for thereby permitting said pivotal movement of said arm so that said arm effects disengagement of said detent member from said canopy member.

2. A canopy actuating assembly for an aircraft comprising a canopy member; an actuator; a drive member engaging said actuator and adapted to engage said canopy member whereby said drive member is operable by said actuator to raise and lower said canopy; retention means connected with said actuator and movable thereby, said retention means being adapted to engage said canopy member for maintaining said canopy member in engagement with said drive member; and cam means connected with said drive member whereby said cam means is movable thereby to a position of interfering engagement with said retention means for preventing disengagement thereof from said canopy member when said canopy member is raised by said drive member, and whereby said cam means is shifted by said drive member to a position free of interference with said retention means when said drive member lowers said canopy member, whereupon further movement of said actuator moves said retention means for effecting disengagement thereof from said canopy member.

3. A canopy actuating mechanism for an aircraft comprising a canopy member; means for pivotally mounting said canopy member in said aircraft; an actuator adapted to move between an extended position, an intermediate position, and a retracted position; a drive member interconnecting said actuator and said canopy member whereby when said actuator is in said extended position said drive member maintains said canopy member in a raised position, and when said actuator is in said intermediate position said canopy member is in a fully lowered position; retention means pivotally carried by said aircraft and adapted to engage said canopy member and said drive member for retaining said canopy member in engagement with said drive member; cam means pivotally carried by said aircraft in engagement with said retention means whereby when said cam means is in an interfering position said retention means is precluded from movement and is thereby maintained in engagement with said canopy member, and when said cam means is in a non-interfering position said retention means is free to move for disengaging said canopy member; means interconnecting said cam means and said drive member for effecting movement of said cam means whereby said cam means is in said interfering position when said actuator is moved between said intermediate position and said extended position, and whereby said cam means is in said non-interfering position when said actuator is moved between said intermediate position and said retracted position so that upon said last mentioned movement of said actuator said retention means is disengaged from said canopy member.

4. A mechanism as recited in claim 3 in which said canopy member is provided with a slotted portion for engaging said mounting means for effecting said pivotal mounting of said canopy member in said aircraft, and including means engaging said canopy member for retaining said slotted portion in such engagement with said mounting means during movement of said canopy member between said lowered position and said raised position while permitting disengagement therefrom when said canopy member is raised beyond said raised position.

5. An aircraft canopy actuating assembly comprising an actuator adapted to assume an extended position, an intermediate position and a retracted position; a drive member pivotally mounted in said airplane and pivotally connected to said actuator at one end thereof, whereby said drive member is movable from a lowered position to a raised position when said actuator is extended from said intermediate position to said extended position; an arm pivotally mounted in said airplane and pivotally connected to said actuator at the opposite end thereof; a linkage, one of the links of which includes a projecting hook portion; a canopy member pivotally mounted in said airplane at the location of the pivotal mounting of said drive member, the lower portion of said canopy member being engageable by said drive member whereby when said drive member is moved to said raised position said canopy member is moved thereby to a raised position, said canopy member including a projection engageable by said hook portion whereby said hook portion maintains said canopy member in engagement with said drive member; a cam pivotally mounted in said airplane adjacent said arm; a connector link interconnecting said cam and said drive member; and a member interconnecting said arm and said linkage whereby said linkage is movable by said arm; said cam being movable by said drive member to a position interfering with said arm for preventing rotation thereof when said drive member is moved from said lowered to said raised position, and movable thereby to a position freeing said arm when said drive member is in a lowered position, whereby when said actuator is moved to said retracted position said arm is rotated thereby for disengaging said hook portion from said projection for freeing said canopy member from said actuating assembly.

6. A canopy actuating assembly for an aircraft comprising a canopy member pivotally mounted in said aircraft; an actuator; a drive member pivotally mounted in said aircraft and pivotally engaging one end of said actuator, said drive member being adapted to engage said canopy member whereby when said actuator is in a first normal position said drive member supports said canopy member in a raised position, and when said actuator is in a second normal position said canopy member is in a fully lowered position unsupported by said drive member; a detent pivotally engaging said drive member and adapted to engage portions of said canopy member for preventing upward movement of said canopy member relative to said drive member; an arm engaging said actuator; means interconnecting said arm and said detent whereby said detent is movable by said arm; cam means connected with said drive member whereby when said actuator is moved between said first and said second normal positions said cam means interferingly engages said arm for preventing movement thereof thereby retaining said detent in engagement with said canopy member, and when said actuator is moved from said second normal position to a third normal position said cam is rotated thereby to free said arm for allowing movement of said arm by said actuator, whereby said arm moves said detent to a position disengaged from said canopy member.

7. A device as recited in claim 6 including in addition roller means carried by said arm, and in which said cam includes one convex arcuate surface adapted to engage said roller means when said actuator is moved between said first and said second normal positions for thereby effecting said interfering engagement with said arm, and including a concave arcuate surface adapted to engage said roller means during movement of said actuator between said second and said third normal positions for thereby permitting movement of said arm.

8. A canopy actuating assembly for an aircraft comprising a canopy member; a pair of trunnions mounted in said aircraft; roller means mounted in said aircraft; said canopy member including a pin projecting therefrom, being provided with a slot adapted to engage said trunnions, and further provided with an arcuate portion adapted to engage said roller means, said canopy member being thereby pivotally though releasably mounted in said aircraft; an actuator, said actuator being operable between a first, a second and a third normal position; a drive member pivotally mounted on said trunnions and adapted to interconnect said actuator and said canopy member whereby movement of said actuator between said first and said second normal positions raises and lowers said canopy member; retention means pivotally mounted in said aircraft in engagement with said actuator and adapted to releasably engage said pin for retaining said canopy member in engagement with said drive member; and cam means pivotally mounted in said aircraft and interconnected with said actuator whereby upon movement of said actuator between said first and said second normal positions said cam means is maintained in interfering engagement with said retention means by means of said drive member for preventing disengagement of said retention means from said pin, and upon movement of said actuator between said second and said third normal positions said drive member moves said cam means to free said retention means whereby said retention means is moved by said actuator to disengage said canopy member for allowing removal of said canopy member from said aircraft.

ARTHUR C. PATCH.
EDWIN L. WALLENHORST.

References Cited in the file of this patent

UNITED STATES PATENTS

| Number | Name | Date |
|---|---|---|
| 2,479,713 | Beach | Aug. 23, 1949 |

FOREIGN PATENTS

| Number | Country | Date |
|---|---|---|
| 640,668 | Great Britain | July 26, 1950 |
| 671,540 | Germany | Feb. 9, 1939 |